Figure 1:
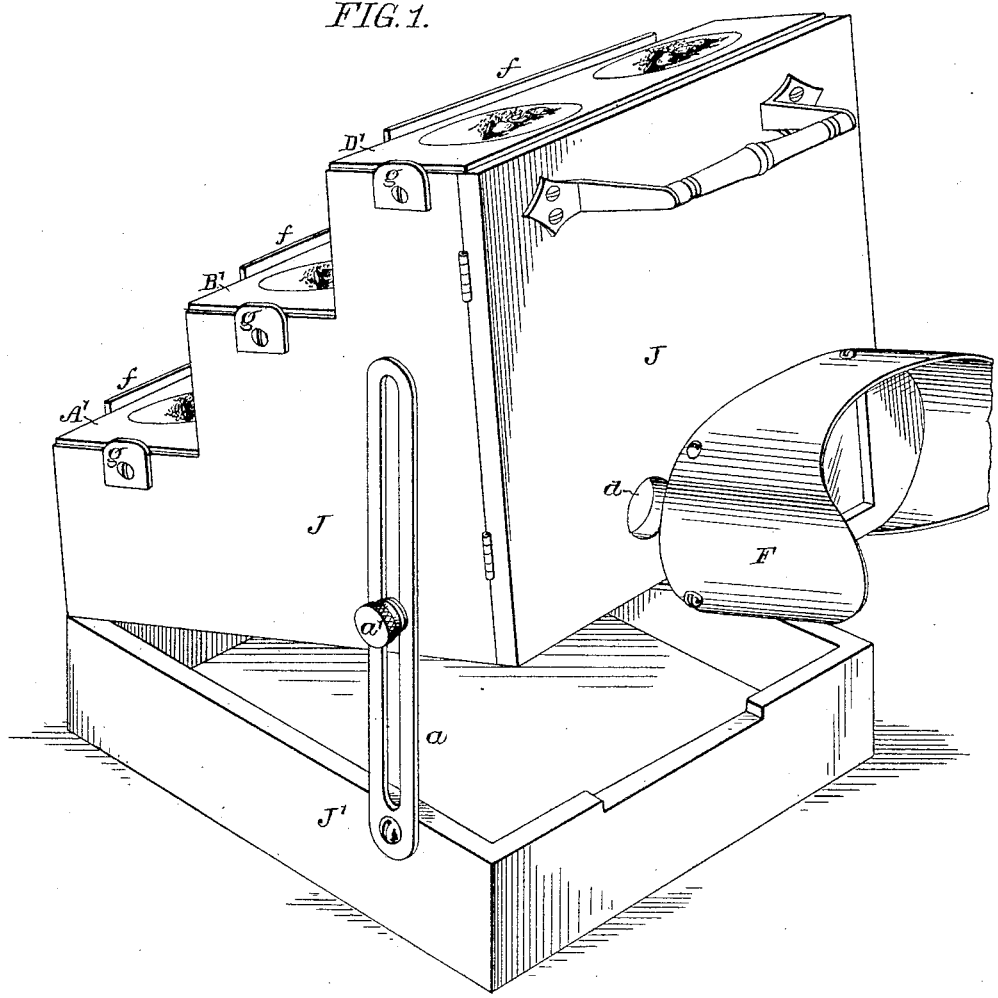

(No Model.) 3 Sheets—Sheet 1.

F. E. IVES.
PHOTOCHROMOSCOPE AND PHOTOCHROMOSCOPE CAMERA.

No. 531,040. Patented Dec. 18, 1894.

Witnesses:
F. D. Goodwin
[signature]

Inventor:
Frederic E. Ives
by his Attorneys
Howson & Howson (No Model.) 3 Sheets—Sheet 2.

F. E. IVES.
PHOTOCHROMOSCOPE AND PHOTOCHROMOSCOPE CAMERA.

No. 531,040. Patented Dec. 18, 1894.

Witnesses:
F. D. Goodwin
Frank Bechtold

Inventor:
Frederic E. Ives
by his Attorneys
Howson & Howson (No Model.) 3 Sheets—Sheet 3.

F. E. IVES.
PHOTOCHROMOSCOPE AND PHOTOCHROMOSCOPE CAMERA.

No. 531,040. Patented Dec. 18, 1894.

Witnesses
F. D. Goodwin
Frank Bechtold

Inventor
Frederic E. Ives
by his Attorneys
Howson & Howson

THE NORRIS PETERS CO., PHOTO-LITHO., WASHINGTON, D. C.

UNITED STATES PATENT OFFICE.

FREDERIC E. IVES, OF PHILADELPHIA, PENNSYLVANIA.

PHOTOCHROMOSCOPE AND PHOTOCHROMOSCOPE-CAMERA.

SPECIFICATION forming part of Letters Patent No. 531,040, dated December 18, 1894.

Application filed July 3, 1894. Serial No. 516,465. (No model.)

*To all whom it may concern:*

Be it known that I, FREDERIC E. IVES, a citizen of the United States, residing in Philadelphia, Pennsylvania, have invented certain Improvements in Photochromoscopes and Photochromoscope-Cameras, of which the following is a specification.

The term "photochromoscope" I apply to an instrument intended to blend together by optical means a series of images of the same subject which constitute what I term a "chromogram" and which are seen through different colored glasses or with different colored lights.

A chromogram consists of a series (preferably three) of photographic positives on glass or other transparent medium, these positives being obtained from a negative or negatives comprising a corresponding series of images of the same subject. Where there are three images one of them should be obtained by rays of light in proportion as they excite the fundamental red sensation, another by rays of light in proportion as they excite the fundamental green sensation, and the third by rays of light in proportion as they excite the fundamental blue or violet sensation, such process forming the subject of my Letters Patent No. 432,530, dated July 22, 1890. Rays of light passing through three such images and through suitable color screens will, if so directed as to accurately superpose the three images, reproduce the natural colors of the object photographed.

In my Patent No. 475,084, dated May 17, 1892, I have shown and described an instrument which was capable of use as a photochromoscope, but said patented instrument was of expensive construction and the object of my present invention is, primarily, to so construct the instrument as to very materially cheapen the same and at the same time render it more acceptable by reason of its greater convenience, its effective lighting of the images, and its provision for the use of both eyes which permits of making the instrument stereoscopic, a result which cannot be attained in an instrument having but a single eye piece.

Figure 4:
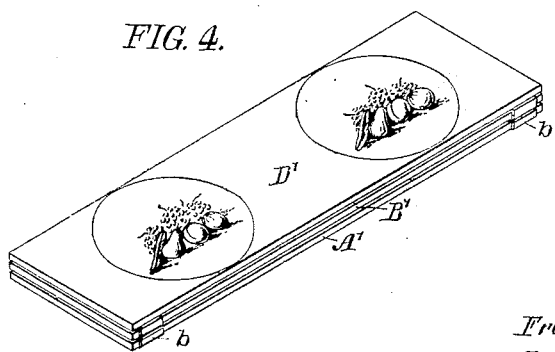
Figure 2:
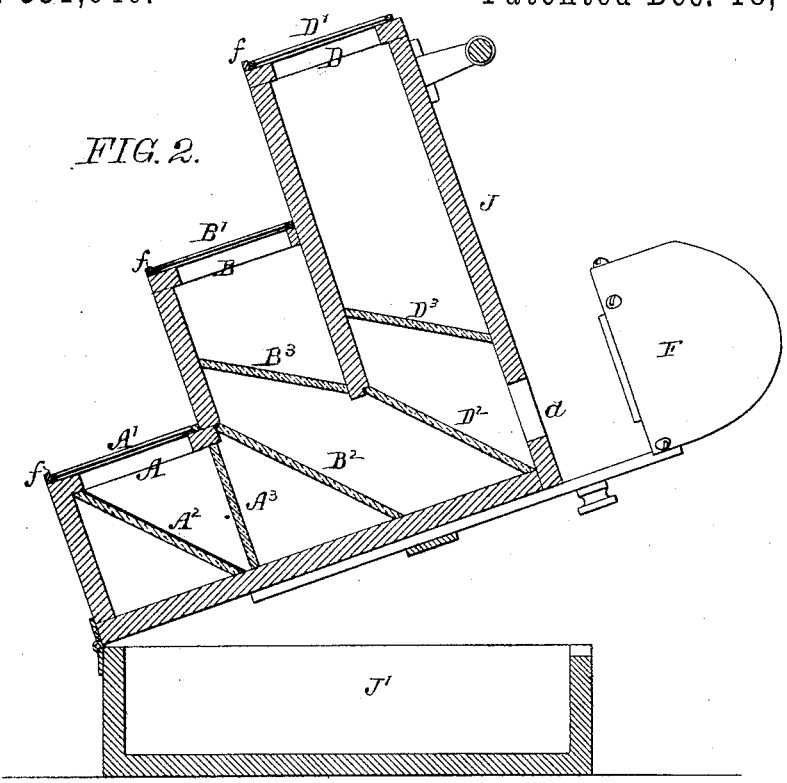
Figure 3:
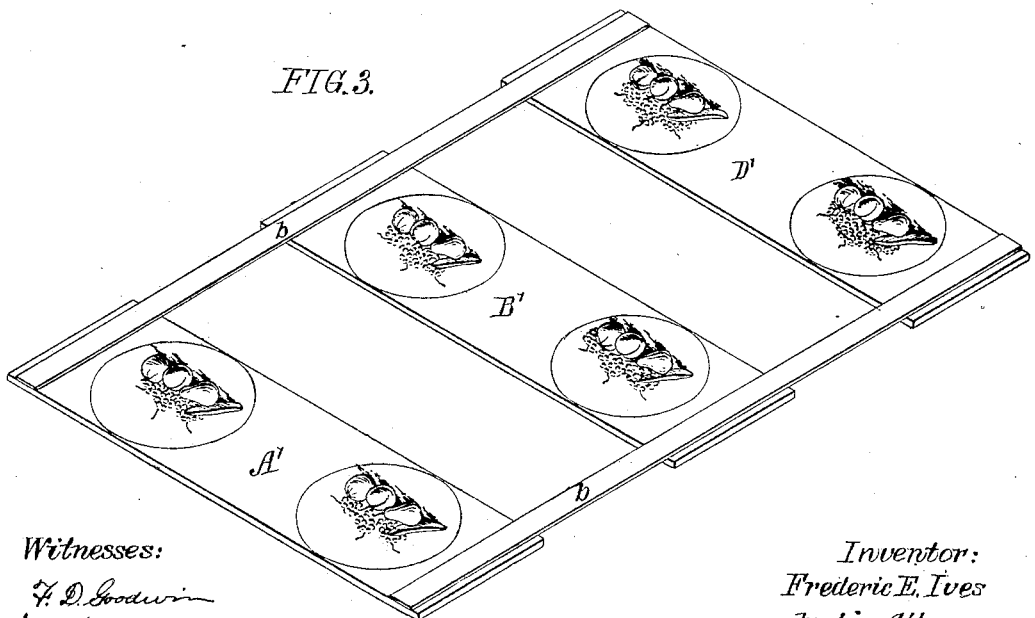
Figure 5:
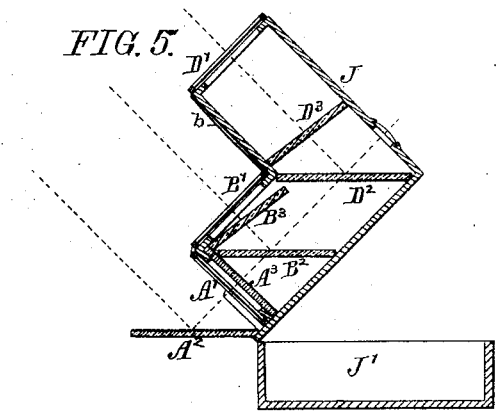
Figure 6:
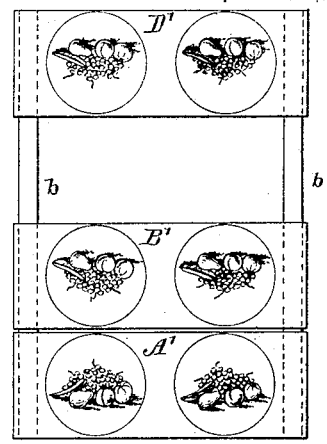
Figure 7:
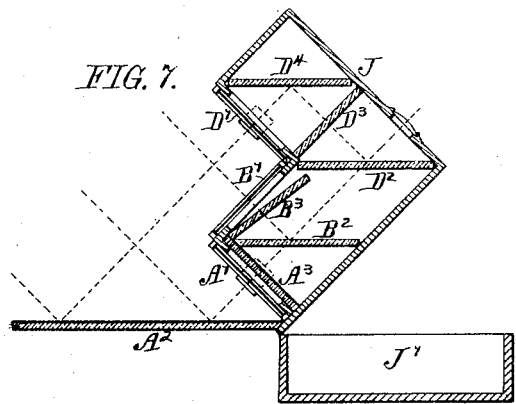
Figure 8:
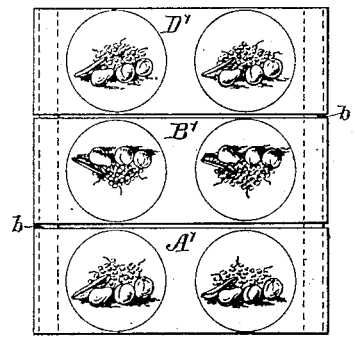
Figure 9:
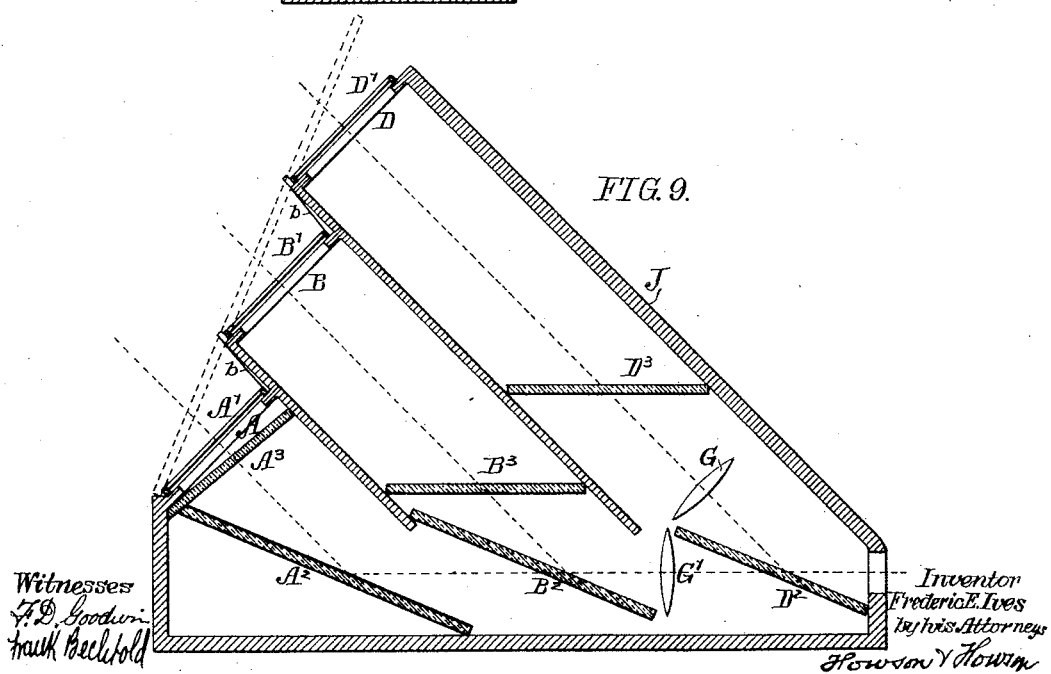

In the accompanying drawings: Figure 1, is a perspective view of a photochromoscope embodying my present invention. Fig. 2, is a sectional view of the same. Fig. 3, is a perspective view of a chromogram intended for use in connection with the instrument, the chromogram being shown in the extended condition. Fig. 4, is a perspective view showing the chromogram folded. Fig. 5, is a sectional view of another form of the photochromoscope which is, for some reasons, preferable to that illustrated in Figs. 1 and 2. Fig. 6, is a view of a chromogram adapted for use in connection with the instrument shown in Fig. 5. Fig. 7, is a sectional view of a slightly modified instrument of the class represented in Fig. 5. Fig. 8, is a view of a chromogram intended for use in connection with the instrument shown in Fig. 7; and Fig. 9, is a view illustrating still another form of instrument.

J represents the casing of the instrument which is preferably hinged at the front lower corner to the front of a box or tray J' which serves as the base of the instrument, and as a receptacle for the chromograms, a pivoted and slotted arm $a$, hung to the base tray J', serving, in connection with a set screw $a'$ on the casing J, to adjust the latter to any angle which may be found to be best for properly transmitting the light.

The top of the box comprises three steps A, B and D, for the support of the chromogram, the latter being made in three sections A', B', D', connected together by flexible strips or cords $b$ of which there may be one or more suitably disposed, two of these strips, one located near each edge of the chromogram, being shown in the drawings.

Each chromogram section consists of a transparent medium upon which the photographic image is directly produced, or it may consist of a strip of any available material having the transparent film bearing the photographic image secured to it in any suitable way.

In the chromograms shown in Figs. 3 and 4 each chromogram section has two images $x$ so as to permit of the stereoscopic use of the instrument, the front of the casing J having two openings $d$ and an ordinary stereoscopic eye piece F being mounted upon the under side of the casing so as to be free to slide to and fro for focusing purposes. It will, of course, be understood, that both of the images formed upon or carried by each section of the chromogram are exactly similar, and also that the images of the three sections of the chromogram are alike save as to the differences in gradations of light and shade which constitute the color record. For instance, the images of the chromogram section A' may represent the fundamental green sensation, those of the section B' the fundamental blue sensation, and those of the section D' the fundamental red sensation.

Each step of the casing A has a strip $f$ serving as a gage or stop for what may be termed the "base edge" of each of the chromogram sections, and another strip or lug $g$ serving as a gage or stop for one end of the chromogram section. Hence when each chromogram section is adjusted so as to bear against the stops $f$ and $g$ of its respective step, the three sections will be so disposed that their images will be accurately superposed when reflected so as to be viewed through the openings $d$.

The reflecting devices consist of an opaque mirror $A^2$ and two transparent mirrors $B^2$ and $D^2$, these three mirrors being used to reflect the rays of light passing through the images of the sections A', B' and D', respectively, of the chromogram, the transparent mirrors serving both as reflectors and transmitters of light.

$A^3$, $B^3$ and $D^3$ represent the respective color screens employed in connection with the three sections A' B' and D' of the chromogram, $A^3$ being the green screen, $B^3$ the blue-violet screen, and $D^3$ the red screen.

The transparent mirrors $B^2$ and $D^2$ may be plain, platinized, or colored. If plain, however, the glasses would have to be slightly wedge shaped in order to prevent the double reflection from both sides of the glass, resulting in a double outline of the image. The platinizing of the glass sufficiently overcomes the necessity for tapering the same, but I prefer to overcome this necessity by making the transparent mirrors of colored glass of such character that such portion of the rays they are intended to reflect as pass into the glass will be absorbed thereby and not reflected from the rear surface, for instance, the mirror $D^2$, used in connection with the red screen $D^3$, may be of cyan-blue color, and the mirror $B^2$ used in connection with the blue screen may be of canary yellow, so that each glass will be absorbent of all of the particular quality of light which it is intended to reflect, but which is not reflected from its front surface, the coloring of the transparent mirrors having no material modifying effect upon the rays which should reach the eye from the mirror or mirrors in the rear.

The coloring of the mirrors $B^2$ and $D^2$ may have an effect supplementary to the color screens $A^3$ and $B^3$ or may even in some cases take the place of one of said screens, for instance, if the mirror $B^2$ is yellow, and the mirror $D^2$ cyan-blue, the light passing through both will be green, and the green screen $A^3$ may not be necessary. The use of the three color screens is, however, in all cases to be preferred in order to obtain with certainty the desired purity and strength of color. It is not necessary that the glasses should be colored in their substance, as the coloring may be in the form of a coating of properly tinted collodion or varnish.

Platinized mirrors, although transparent, reflect more light than plain or colored glasses and would be preferable to the latter if they could be made with perfectly plane surfaces which, however, appears to be difficult, if not impossible.

In that form of instrument shown in Fig. 5, the casing A has but two steps and the section A' of the chromogram lies against the front of the casing, the mirror $A^2$ being an external mirror so that the rays of light which illuminate said section A' are reflected before passing through the same instead of after such passage, as in the case of the sections B' and D' of the chromogram. In this instrument I can also substitute for the external mirror $A^2$ a dead white reflector, which may, if desired, be detached from the casing and laid upon the table in front of the instrument, but the mirror seems preferable, in order to insure for the image of the green sensation light of the same intensity as that for the other two images. The construction of the instrument as shown in Fig. 5, necessitates the spacing of the sections of the chromogram in the manner shown in Fig. 6, and also a reversal of the images of the section A' in respect to those of the sections B' and D', as also shown in Fig. 6.

In the form of instrument shown in Fig. 7 provision is made for uniform spacing of the sections of the chromogram as shown in Fig. 8, and in this case the mirror $A^2$ is considerably larger than in the instrument shown in Fig. 5 so that it can reflect the rays of light through both sections A' and D' of the chromogram, the rays after passing through the images of the section D' being again reflected first by the opaque mirror $D^4$ and then by the transparent mirror $D^2$. The images of the section B' of the chromogram intended for use in connection with this instrument are reversed in respect to those of the sections A' and D' as shown in Fig. 8.

The instruments shown in Figs. 5 and 7 are more compact than that shown in Figs. 1 and 2, and are therefore preferable to the same on that account, and further because they bring the eye nearer to the chromogram and thus show a larger image without the use of magnifying lenses.

In Fig. 9 I have shown a form of instrument in which the mirrors, instead of being arranged at an angle of forty-five degrees in respect to the horizontal, as in the instrument previously described, are only at an angle of twenty-two and one-half degrees in respect to the horizontal, the object of this disposal of the mirrors being to increase the reflective power of the transparent mirrors, the chromogram sections being arranged at an angle of forty-five degrees in respect to the horizontal. I may in this instrument, however, use a single chromogram in the manner represented by dotted lines, the slight distortion of the image due to the different distances of different parts of the same from the eye not being sufficient to materially affect the accuracy of the image and this distortion being capable of correction by a reverse distortion of the images in the original negative.

In the instrument shown in Fig. 9 I have illustrated condensing lenses G and G', and in all of the instruments, certain advantages are gained by placing a condensing lens immediately behind each image of the chromogram, but such lenses are not necessary. When they are employed I prefer in some cases to use plano-convex lenses and to cement the color screen to the plane side of the lens.

Although I have described the sectional chromogram as having its sections connected by strips of flexible material, and although I prefer this method of construction, it will be evident that metallic hinges may be substituted for the flexible strip as a means of connecting the chromogram section or sections disconnected from each other and may be used in the instrument with equally good results. It will be evident also that each of the forms of instrument which I have described may be single and binocular, or single and monocular, instead of stereoscopic, and by the use of suitable lenses and color screens and the substitution of plate holders for the chromogram holders either form of instrument may be adapted for making the chromogram negative as well as for exhibiting the chromogram.

The arrangement of images in steps and the reflection of the light passing through these images by means of transparent mirrors is not new, but in the only prior device of this kind with which I am familiar the steps were perpendicular to the base of the instrument and the transparent mirrors were glasses with parallel surfaces which doubled the outlines of the respective images. This taken in connection with the inconvenience of the instrument rendered the same so defective as to make it practically useless, and the vertical arrangement of the mirrors estopped the making of the instrument binocular or stereoscopic except by duplication of its parts or enormous increase in size.

In all of the various forms of my instrument, however, what may be termed the base edge of the chromogram or of each section of the chromogram is horizontal, and the images are located one above another, whereby I am enabled to bring the angles of illumination and vision into the most desirable relation to each other and to the most convenient source of light, namely, a light sky seen through a window, and I am furthermore enabled to make the instrument binocular or stereoscopic without complicating its construction or making it of inconvenient size, and I also provide for the most convenient use of the folding chromogram while the use of the colored transparent mirrors effectually prevents any doubling of outline of the images reflected thereby.

Having thus described my invention, I claim and desire to secure by Letters Patent—

1. A casing for a photochromoscope or photochromoscope camera having a series of inclined reflecting mirrors some of which are transparent, a series of color screens and a chromogram or plate support having its base line so disposed that the images of the chromogram or plate will be located one above another, substantially as specified.

2. A casing for a photochromoscope or photochromoscope camera having a series of inclined mirrors some of which are transparent, a series of color screens and a series of chromogram or plate supports one above another, substantially as specified.

3. A photochromoscope comprising a casing having a series of inclined mirrors some of which are transparent, a series of color screens, a series of chromogram supports one above another, and means for varying the angle of said instrument in respect to the direction of the light rays, substantially as specified.

4. The combination in a photochromoscope, of a casing having a series of inclined mirrors, some of which are transparent, a series of color screens, one or more supports for the chromogram so arranged that the images are located one above another, and a binocular or stereoscopic eye piece, substantially as specified.

5. A chromogram consisting of a series of sections united so as to be capable of folding one upon another, the images of the sections being identical in size and perspective, but with differences in gradations of light and shade, which differences constitute a color record, substantially as specified.

6. A chromogram consisting of a series of sections united by flexible cords or strips, the images of the sections being identical in size and perspective, but with differences in gradations of light and shade, which differences constitute a color record, substantially as specified.

7. A chromogram consisting of a series of pairs of images, the images of each pair being alike, except for the difference of perspective which characterizes the two images of a stereoscopic photograph and the pairs of images being identical in size and perspective, but with differences in gradations of light and shade, which differences constitute a color record, substantially as specified.

8. A photochromoscope comprising a casing having a series of seats one above another, for a sectional chromogram, a series of inclined mirrors, and a series of color screens, the chromogram supports and mirrors being so arranged that the instrument is adapted for use in connection with an external reflector, substantially as specified.

9. A photochrmoscope having a transparent mirror located therein at an angle, so as to reflect and also transmit rays of light, said mirror being so colored that it will absorb unreflected rays of a character which the mirror is designed to reflect, but transmit rays of the character which the mirror is designed to transmit.

10. A binocular or stereoscopic photochromoscope having one or more chromogram supports so disposed that the images of the chromogram are located one above another, a series of color screens, and a series of mirrors some or all of which are transparent, said mirrors being inclined in a horizontal plane and located one behind another in the line of sight, substantially as specified.

11. A photochromoscope comprising a casing having a series of seats one above another, for a sectional chromogram, a series of inclined mirrors some or all of which are transparent, said mirrors being located one behind another in the line of sight and inclined in a horizontal plane, substantially as specified.

In testimony whereof I have signed my name to this specification in the presence of two subscribing witnesses.

FREDERIC E. IVES.

Witnesses:
WILLIAM A. BARR,
JOSEPH H. KLEIN.